United States Patent
List Clausen et al.

(10) Patent No.: US 9,944,153 B2
(45) Date of Patent: Apr. 17, 2018

(54) VEHICLE DOOR AND METHOD FOR THE PRODUCTION THEREOF

(71) Applicant: BENTELER AUTOMOBILTECHNIK GMBH, Paderborn (DE)

(72) Inventors: Edwin List Clausen, Lojt Kirkeby Abenra (DK); Jochem Grewe, Salzkotten (DE); Joern Toelle, Paderborn (DE); Dariusz Straznikiewicz, Paderborn (DE); Martin Schroeter, Paderborn (DE); Gero Muellers, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/884,847

(22) Filed: Oct. 16, 2015

(65) Prior Publication Data
US 2016/0107512 A1  Apr. 21, 2016

(30) Foreign Application Priority Data
Oct. 17, 2014  (DE) .......... 10 2014 115 151

(51) Int. Cl.
*B60J 5/04* (2006.01)
*B23P 13/04* (2006.01)

(52) U.S. Cl.
CPC ........... *B60J 5/0466* (2013.01); *B60J 5/0402* (2013.01); *B60J 5/0426* (2013.01); *B60J 5/0427* (2013.01); *B60J 5/0431* (2013.01); *B60J 5/0436* (2013.01); *B60J 5/0448* (2013.01); *B60J 5/0455* (2013.01); *B23P 13/04* (2013.01); *B60J 5/0483* (2013.01)

(58) Field of Classification Search
CPC ...... B60J 5/0466; B60J 5/0436; B60J 5/0448; B60J 5/0426; B60J 5/0431; B60J 5/0427; B60J 5/0455; B60J 5/0402; B60J 5/0483; B23P 13/04
See application file for complete search history.

(56) References Cited

U.S. PATENT DOCUMENTS

| | | | | |
|---|---|---|---|---|
| 4,140,556 | A * | 2/1979 | Baba | ...................... C22C 21/06 148/417 |
| 6,082,811 | A | 7/2000 | Yoshida | |

(Continued)

FOREIGN PATENT DOCUMENTS

| | | |
|---|---|---|
| CN | 101021135 A | 8/2007 |
| CN | 201280885 Y | 7/2009 |

(Continued)

OTHER PUBLICATIONS

State Intellectual Property Office of the People's Republic of China Office Action dated Aug. 23, 2016.

(Continued)

*Primary Examiner* — Christopher M Koehler
(74) *Attorney, Agent, or Firm* — Hauptman Ham, LLP

(57) ABSTRACT

A motor vehicle door and a method for producing the motor vehicle door is disclosed having a frame plate coupled to reinforcement components and at least half of all of the reinforcement components are produced as extruded profiles which are subsequently press-formed three-dimensionally. The extruded profiles have different wall thicknesses.

9 Claims, 3 Drawing Sheets

(56) References Cited

U.S. PATENT DOCUMENTS

| | | | |
|---|---|---|---|
| 2003/0164207 A1* | 9/2003 | Kashiwazaki | B21C 23/001 148/440 |
| 2003/0177702 A1* | 9/2003 | Hock | B60J 5/0402 49/502 |
| 2008/0246308 A1* | 10/2008 | Uchida | B21D 7/08 296/187.03 |
| 2012/0018422 A1* | 1/2012 | Bohner | B21D 37/16 219/602 |
| 2012/0192613 A1 | 8/2012 | Sakae | |
| 2013/0154300 A1* | 6/2013 | Arzoumanian | B62D 25/145 296/72 |
| 2014/0110964 A1* | 4/2014 | Schijve | B60J 5/0422 296/146.6 |
| 2014/0203576 A1* | 7/2014 | Handing | B60R 19/023 293/102 |
| 2014/0311308 A1* | 10/2014 | Hansen | B21D 28/243 83/54 |
| 2016/0121830 A1* | 5/2016 | Rabe | B60R 19/34 293/133 |

FOREIGN PATENT DOCUMENTS

| | | |
|---|---|---|
| CN | 202243293 U | 5/2012 |
| CN | 103290278 A | 9/2013 |
| CN | 103921655 A | 7/2014 |
| DE | 19857589 A1 | 7/1997 |
| DE | 19850150 A1 | 5/2000 |
| DE | 102005061562 A1 | 7/2007 |
| EP | 0776778 A1 | 6/1997 |
| EP | 0803389 A2 | 10/1997 |
| EP | 0872291 A1 | 10/1998 |
| EP | 1598227 A1 | 11/2005 |
| JP | 3139984 B2 | 3/2001 |
| WO | 2007065510 A1 | 6/2007 |

OTHER PUBLICATIONS

Chinese Office Action, Application No. 201210671013.6, dated Sep. 1, 2017, 11 pages.

* cited by examiner

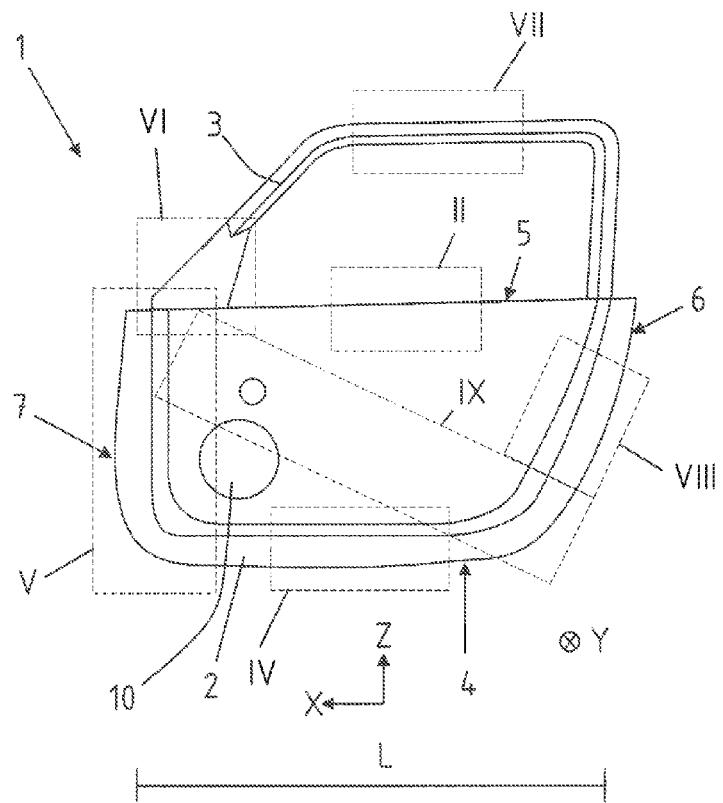
Fig. 1
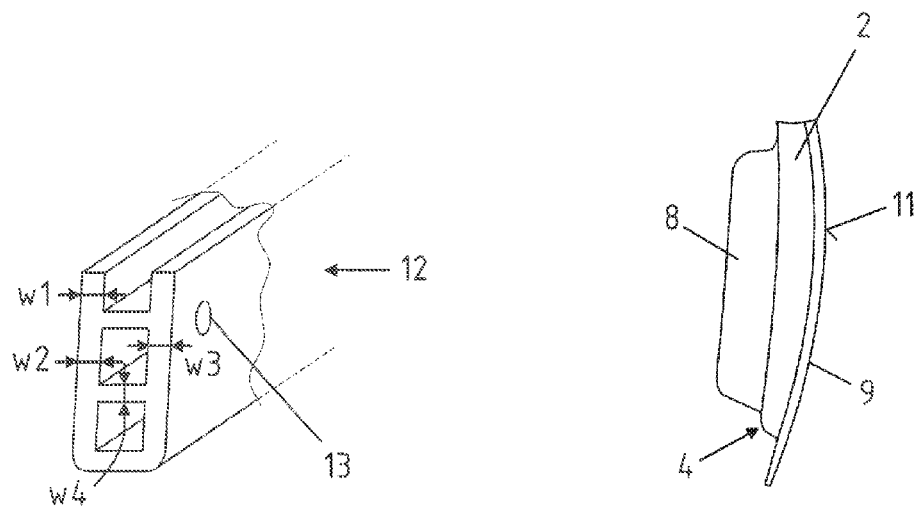
Fig. 2
Fig. 3

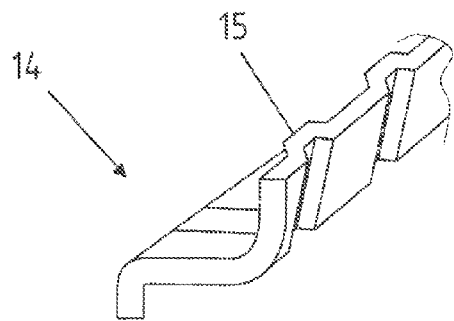
Fig. 4
Fig. 5a
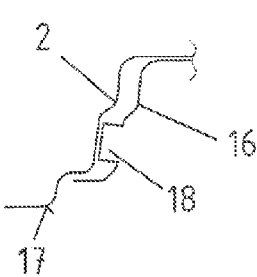
Fig. 5b
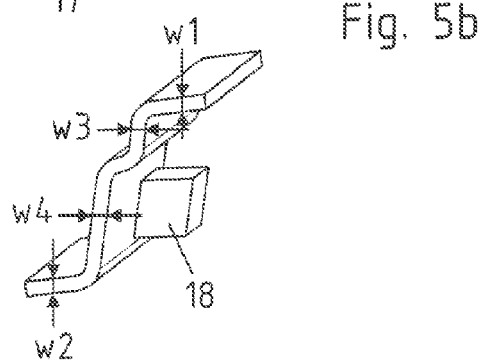
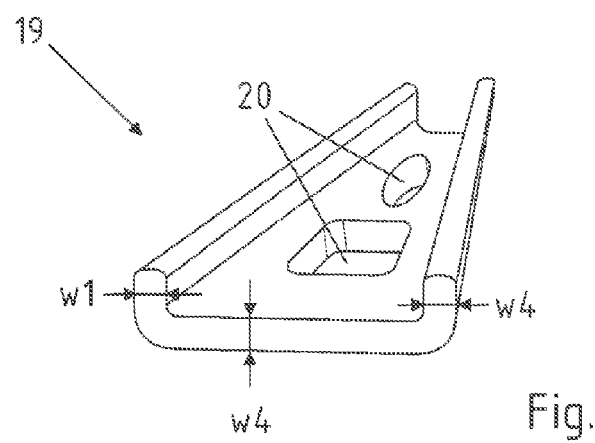
Fig. 6

VEHICLE DOOR AND METHOD FOR THE PRODUCTION THEREOF

RELATED APPLICATIONS

The present application claims priority from German Application Number 10 2014 115 151.8, filed Oct. 17, 2014, the disclosure of which is hereby incorporated by reference herein in its entirety.

FIELD OF THE INVENTION

The present invention further relates to a method for producing a motor vehicle door according to the features in the preamble of claim 1.

BACKGROUND OF THE INVENTION

From the prior art it is known to produce motor vehicles by means of a self-supporting body. The motor vehicle body in this case has openings, in particular lateral openings, doors being inserted therein. Nowadays, many specifications are set for a motor vehicle door. Firstly, these specifications must be highly accurate in order to ensure a precise and, in particular, small gap size on the motor vehicle body produced. At the same time, a motor vehicle door itself has to receive a plurality of system components, for example electrical window lifters, a central locking system, loudspeakers or the like. To this end, the motor vehicle door itself has to be configured to be as stable as possible. Additionally, it is important in the event of a side impact of a motor vehicle door, in particular, that said motor vehicle door is intended to provide a high degree of crash safety.

Moreover, in this case the motor vehicle door is intended to have a dead weight which is as low as possible so that the total weight of the motor vehicle may be reduced in order to achieve low fuel consumption. Additionally, the motor vehicle door is intended to be produced cost-effectively.

To this end, different approaches are known from the prior art for producing motor vehicle doors in order to fulfill the aforementioned requirements. Thus, for example, a motor vehicle door is disclosed in EP 0 803 389 A2 in which a door frame is provided, said door frame being made up of light metal cast components as well as extruded profiles, an outer wall and an inner wall being coupled thereto in turn.

SUMMARY OF THE INVENTION

It is the object of the invention, therefore, to disclose a means for producing a motor vehicle door in a cost-effective manner which is optimized in terms of weight with a high load-bearing capacity.

The part of the object relating to the production method is also achieved by a method for producing a motor vehicle door having the features in claim 1.

Advantageous variants of the present invention form the subject-matter of the respective dependent claims.

The motor vehicle door made of light metal comprises a frame plate, wherein a sill reinforcement, a beltline reinforcement, a mirror reinforcement, a lock reinforcement, a hinge reinforcement and optionally a door impact support are coupled to the frame plate, characterized in that at least half of the aforementioned reinforcement components are respectively produced as separate extruded profile components, wherein each extruded profile component is subsequently three-dimensionally shaped and is coupled to the frame plate and at least two components have a wall thickness which is different in cross section.

According to the invention, therefore, preferably all of the reinforcement components are produced from the same light metal material.

Thus a frame plate may be initially produced as a door frame structure, which is configured as a peripheral frame between a door beltline, which is located approximately at a level with the upper arm of a motor vehicle occupant, and a side sill of the motor vehicle which is located at a level with the vehicle floor, as well as a front side with a hinge connection and a rear side with a lock connection. This is understood, therefore, as a peripheral frame. Optionally, a window pane frame and/or window frame may already be configured in one piece and in the same material on the frame plate and/or a separate window pane frame may be coupled to the frame plate.

According to the invention, it is now provided that the frame plate is configured, in particular, as a press-formed component. In order to fulfill the different requirements for the motor vehicle door, corresponding reinforcement components are now coupled to the frame plate. In this case, according to the invention these reinforcement components are produced, in particular, cost-effectively such that said components are initially produced as extruded profiles, preferably with different wall thicknesses. Therefore, an individual extruded profile is produced for one respective reinforcement component. For example, the door impact support is produced from a different extruded profile from the sill reinforcement. The extruded profiles are then cut to length to form individual extruded pieces and then according to the invention subsequently reshaped three-dimensionally. This is carried out, in particular, by press forming. The extruded profiles are in turn produced with different wall thicknesses in cross section and optionally in the longitudinal direction. Within the scope of the invention, therefore, the means may be provided in a simple and cost-effective manner to provide wall thicknesses and/or material thicknesses and thus associated strength properties specifically for the motor vehicle door. For example, a beltline reinforcement in the region of a lower edge of the window of the motor vehicle door may be provided in the form of an individually shaped hollow profile, whereas a sill reinforcement is produced as a flat profile and/or contoured profile in cross section but not, for example, as a hollow profile. Similarly, the sill reinforcement may also be produced as a hollow profile.

As a result, therefore, a considerable amount of material may be saved and this results in weight saving for the motor vehicle door, whilst the strength remains at least the same or even higher. Costly production processes, for example using hybrid components comprising different materials, or the use of expensive special materials, for example fiber-reinforced materials, and cost-intensive production operations may be avoided.

Within the scope of the invention, the individual reinforcement components such as the sill reinforcement, beltline reinforcement, mirror reinforcement, lock reinforcement, hinge reinforcement and the optional door impact support and, in particular, further hinge reinforcements or lock reinforcements are regarded in each case as one component, wherein at least half of these reinforcement components are produced as an extruded component with different wall thicknesses and subsequent three-dimensional shaping. This means that in, for example, ten reinforcement components at least five reinforcement components have the aforementioned properties. This would then be 50% of the components. Within the scope of the invention it is also particularly preferably provided that 60%, in particular 70%, quite particularly preferably 80%, and in particular 90%, of the reinforcement components are produced according to the aforementioned production methods and then coupled to the frame plate.

Moreover, at least two of the aforementioned reinforcement components respectively have different wall thicknesses in the cross section thereof. This means that each component with a different wall thickness has a different wall thickness in its own cross section. Optionally, therefore, a window frame reinforcement may also be configured as a reinforcement component. The window frame reinforcement may extend in a peripheral manner on at least three sides of the window frame, thus to the front, to the top and to the rear relative to the direction of travel. Within the scope of the invention, a window frame reinforcement, however, may also extend in a peripheral manner on all sides, thus also in the region of the door beltline. Within the scope of the invention, in this case the window frame reinforcement may be configured in one piece and from the same material. The window frame reinforcement, however, may also be configured in multiple parts, so that only part of the window frame reinforcement is arranged in some regions. The window frame reinforcement, however, even in multiple parts may also be configured to extend in a peripheral manner at least in some regions. The individual parts, therefore, not only bear against the frame plate but are also coupled together.

In particular, to this end the extruded profile components are furthermore produced from a 6000 series or 7000 series aluminum alloy and the frame plate from a 5000 series or 7000 series aluminum alloy. These alloys provide, in particular, the possibility that initially the reinforcement profile components have a strength of between 150 MPa and 550 MPa, in particular between 200 MPa and 500 MPa. As a result, the capacity for shaping is considerably increased due to the higher degrees of deformation. It is then also possible to produce the desired strength of the respective reinforcement component in a subsequent artificial ageing process or natural ageing process.

The reinforcement components, which are potentially not produced by extrusion and complex three-dimensional shaping and which are also configured from different light metal alloys, may be produced in this case within the scope of the invention according to further conventional production methods and coupled to the frame plate.

Further particularly preferably, the extruded profile components and/or the reinforcement components are stamped, perforated and/or cut in further processing steps, wherein the reinforcement components are the extruded profile components after shaping. This is required in order to produce, for example, corresponding outer contours or through-openings and/or mounting openings in the components.

The reinforcement components are then coupled by a positive and/or material connection to the frame plate. In particular, a bonding method, a thermal joining method, in particular a welding method and/or a positive connecting method, for example a riveting method or even press-joining may be used to this end. Depending on the application, the individual coupling methods may be used individually or even in combination with one another. Within the scope of the invention, it is further particularly provided that at least one reinforcement component is coupled to the frame plate such that the reinforcement component in two regions comes to bear against the frame plate positively. Between the reinforcement component and the frame plate, therefore, a hollow space and/or a hollow profile structure is produced, also denoted as a hollow chamber. The hollow chamber, however, does not necessarily have to be completely closed on all sides but may also be open on one side or, in particular, on two sides.

In particular, shaped portions, collars, through-holes and/or lugs may also be formed on the reinforcement component and, in particular, integrally formed therein, wherein the reinforcement components come to bear positively with the aforementioned regions against the frame plate and are coupled to the frame plate by means of a joining process by a positive and/or material connection.

Further particularly preferably, therefore, a window frame is coupled to the frame plate, wherein particularly preferably the window frame also has the above-described properties. This means that initially an extruded profile is produced, said extruded profile then being bent in a further method step and at the same time and/or subsequently being shaped three-dimensionally, in particular press-formed, in order to produce the desired outer contour, for example a curvature inclined toward the roof. The window frame is then, in particular, coupled to the frame plate, particularly preferably by thermal joining.

Further particularly preferably, an outer panel and optionally an inner panel are coupled to the frame plate. The outer panel in this case corresponds to the outer skin of the motor vehicle body. The entire motor vehicle door is thus formed with the seals and system components incorporated therein.

The present invention also relates to a method for producing a motor vehicle door, wherein a frame plate made from a light metal alloy is provided, at least one reinforcement component being coupled thereto and characterized by the following method steps:

producing an extruded profile from an aluminum alloy, wherein the extruded profile has different wall thicknesses in the longitudinal direction and/or in the transverse direction, cutting the extruded profile to length to form individual extruded profile pieces, three-dimensional press forming of the extruded profile piece to form a reinforcement component, optional stamping and/or perforating of the extruded profile piece and/or the reinforcement component, coupling the reinforcement component to the frame plate.

Within the scope of the invention, therefore, it is possible to produce the entire motor vehicle door from approximately the same material which permits effective coupling, in particular the ability of the individual components to be welded to one another. Moreover, it is possible by the method according to the invention to provide a highly complex door which is optimized in terms of components, in a particularly cost-effective manner. By the separate coupling of the reinforcement components it is possible to provide material thicknesses and/or cross-sectional geometries specifically at points of high load, for example in the event of a crash. The production methods required therefor are, however, considerably simplified, in particular relative to aluminum cast components and/or the use of reinforcement components, for example made of steel. For example, a door impact support made of a high strength steel alloy, which is then incorporated only by means of complex and thus cost-intensive coupling methods into a vehicle door otherwise consisting of aluminum, does not have to be provided. The same applies, for example, to a lock support or hinge support.

The aforementioned motor vehicle door is produced, in particular, by means of the method according to the invention. For producing the different reinforcement components, including the beltline reinforcement, lock reinforcement, hinge reinforcement, door impact support and/or mirror reinforcement, the individual reinforcement components are produced from different extruded profile pieces. Within the scope of the invention, however, it is also possible advantageously to produce a plurality, ideally all, of the reinforcement components from the same extruded profile, in particular due to the three-dimensional press forming. By separating a multi-chamber hollow profile, for example in the longitudinal direction, it is possible to produce extruded profiles which, by further three-dimensional shaping and cutting to length, are able to be used as a door reinforcement, hinge reinforcement and/or lock reinforcement. The hollow chamber profile in turn may be used in order to produce a window frame reinforcement and/or a door impact support. By a corresponding compression and/or flattening of the hollow profile a sill reinforcement may in turn be produced. In particular, by the subsequent three-dimensional press forming, the extruded profiles are not only able to be used in their original cross-sectional contour but are able to be individually adapted to the required reinforcement component.

Before the three-dimensional press forming, the extruded profile pieces are, in particular, solution-annealed at preferably 400° C. to 550° C. and then quenched before, during or after shaping. This is followed by a natural ageing process or artificial ageing process, depending on the desired strength to be set. For example, the reinforcement components, such as the door impact support or even the beltline reinforcement and sill reinforcement, may be produced from a higher quality aluminum alloy with higher potential degrees of strength and from a more complex ageing process to achieve a higher strength grade, whereas for example a lock reinforcement or a hinge reinforcement requires only a lower degree of strength by comparison.

The reinforcement components produced by three-dimensional press forming are thus coupled to the frame plate by being joined together by a material and/or positive connection. In particular, to this end the reinforcement components are bonded and/or riveted and/or screwed to the frame plate, depending on the strength required for the coupling. If, however, in one region an extremely high degree of accuracy is required, for example a bonding process may preferably also be used so that thermal distortion by welding is substantially avoided. Thermal joining by welding, however, is also conceivable within the scope of the invention.

Further particularly preferably, the attached reinforcement components have receivers and/or mounting openings for further attached parts. In the case of a hinge reinforcement, this is the receiver for a door hinge. In the case of the lock reinforcement, this is the means for receiving a door lock. For example, an electrical window lifter and/or a side airbag module may be attached to a beltline reinforcement. In some cases, these receivers require a high degree of precision, in particular in door hinges and door locks.

Moreover, a door impact support for a motor vehicle door is provided, wherein the door impact support is configured from a multi-chamber extruded hollow profile of a light metal alloy with different wall thicknesses in cross section, wherein the door impact support in its longitudinal direction has a Y-shaped contour, and one respective end of the arms of the Y-shaped contour is located at a level with a hinge connection of the motor vehicle door and the arms have one respective hollow chamber, wherein a central portion in cross section has two, in particular three, hollow chambers, and one respective end is optionally configured so as to be flattened.

This means within the scope of the invention that the entire door impact support has a Y-shape in side view. The arms facing the hinge connections of the door, i.e. substantially in the direction of travel to the front, form the two arms of the Y-shape. Said arms extend so as to bend away from one another, such that one respective end of a Y-arm is at a level and/or in the region of a hinge connection of the motor vehicle door. The base of the Y-shape in this case forms a central portion and the end portion of the door impact support opposing the Y-arm in the longitudinal direction. The base is in the form of a multi-chamber hollow profile, in particular as a two-chamber, preferably three-chamber, hollow profile. The two arms of the Y-shape have one respective hollow chamber, in the case of a two-chamber hollow profile.

At the respective ends the door impact support is flattened, wherein the door impact support has three ends, firstly the two ends in each case on the Y-arm and secondly the end on the base. At these flattened points the door impact support is then attached to the motor vehicle door, in particular to a door frame of the motor vehicle door.

According to the invention, this results in the advantage that the door impact support is able to be produced particularly cost-effectively. Initially, an extruded profile which is produced with the desired cross section, in particular the central portion, is provided. The extruded profile already has different wall thicknesses in cross section, so that during the extrusion process the preferred flexural strength to be set may already be individually catered for.

Thus the extruded profile which has been produced is cut to length and incised in the region of the Y-shaped arms to be produced and the arms are bent apart from one another. Subsequently, three-dimensional press forming is then carried out so that the door impact support has a different cross-sectional path, preferably in the longitudinal direction, in particular in the region of the base. This may take place by compressing or stretching the respective cross-sectional portion, so that, for example, the width or height of the cross section is altered. Additionally, the ends are flattened and the Y-arms in each case are provided with only one hollow chamber.

The door impact support according to the invention is, in particular, configured in one material and in one piece. To this end, it is also provided to use a 6000 series and/or 7000 series aluminum alloy as these may be shaped, in particular in the solution-annealed state, and at the same time provide a high degree of freedom in terms of shaping. Subsequent to the shaping process, the shaped component which has been produced is quenched and the desired strength is set in a subsequent optional natural and artificial ageing process.

The cross section which alters in the longitudinal direction, in particular of the central portion, thus of the lower base of the Y-shape, is particularly preferably configured such that it reduces in its height from a bifurcation point of the Y-shape in the direction of the free end of the individual base and increases in its width. Finally, the base is in turn flattened, wherein in this case the height is increased and the width extremely reduced.

BRIEF DESCRIPTION OF THE DRAWINGS

Further advantages, features, properties and aspects of the present invention form the subject-matter of the following description. Preferred variants are shown in the schematic drawings. These drawings serve for easy understanding of the invention. In the drawings:

FIG. 1 shows a motor vehicle door according to the invention in a side view,

FIG. 2 shows a beltline reinforcement according to the invention in a perspective view, FIG. 3 shows a front view of the door without the window frame, FIG. 4 shows a perspective view of a sill reinforcement profile, FIGS. 5a and 5b show a door hinge reinforcement in a sectional view from above and a perspective rear view, FIG. 6 shows a mirror reinforcement in a perspective view.

The same reference numerals are used for the same or similar components in the figures, even if a repeated description is dispensed with for reasons of simplification.

DETAILED DESCRIPTION OF THE EMBODIMENTS

Figure 7:
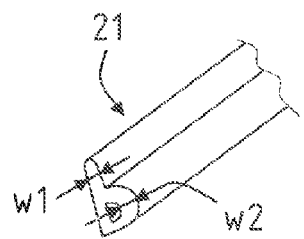
FIG. 7 shows a window frame reinforcement in a perspective view.

FIG. 1 shows a motor vehicle door 1 according to the invention which represents a frame plate 2, illustrated here with the window frame 3 in position. The frame plate 2 is in this case configured to extend in a peripheral manner and has a lower sill region 4, an upper beltline region 5 on the lower side of the window pane, not shown in more detail, a rear lock region 6 which, for example in a front door, comes to bear in the region of the B-pillar and a front hinge region 7 which, in a front door, in turn comes to bear against the A-pillar. In this case, the frame plate 2 is configured in turn as a sheet metal component made in one piece and of the same material. This may either form the window frame, by being shaped in one piece and in the same material and being coupled to the window frame reinforcement 21 shown in FIG. 7, or the window frame reinforcement 21 may also directly form the window frame. This is coupled in the known manner, not shown in more detail here, to the frame plate 2, thus to the lower door portion.

The frame plate 2 has a window pane frame made in one piece and of the same material.

FIG. 3 additionally shows a side view without the window frame, in which additionally an inner panel 8 and an outer panel 9 are placed on the frame plate 2. In the inner panel 8, for example, a loud speaker recess 10 is present and the outer panel 9 forms as it were the outer skin 11 of the motor vehicle.

So that the frame plate 2 now fulfills sufficient requirements for rigidity and has sufficient rigidity, it is coupled to reinforcement components. Firstly in the beltline region 5 a beltline reinforcement 12 is shown in FIG. 2. The beltline reinforcement 12 in this case has different wall thicknesses w1, w4, wherein the wall thickness is able to be formed individually by producing the extruded profile. The beltline reinforcement 12, in this case relative to FIG. 1, may cover the same length L of the door or only a partial region. The beltline reinforcement 12 according to the invention is shown here as a hollow chamber profile, in particular a two-chamber hollow profile, with an additional partially open chamber protruding upwardly in the motor vehicle vertical direction.

For example, a door lining and a window frame seal may be received thereby. By means of the individual chambers a high degree of rigidity with a low dead weight is in turn provided. Moreover, the beltline reinforcement has an opening 13 for coupling, for example, to the frame plate 2 by means of a riveted or screw connection or to further attached parts, for example for screwing a door lining, not shown in more detail, or a mirror, not shown in more detail, in the front region of the door. The beltline reinforcement 12 is initially produced from an extruded profile and subsequently three-dimensionally press-formed so that it follows a slight curvature extending in the longitudinal direction L of the door.

Moreover, the door has a sill reinforcement 14 shown in FIG. 4. The sill reinforcement 14 in this case is in the form of a reinforcing strip which in turn has an S-shaped cross section. To this end, reinforcing beads 15 extending in the motor vehicle transverse direction are incorporated, said reinforcing beads ensuring additional reinforcement and crash protection in the motor vehicle transverse direction. Furthermore, the sill reinforcement 14 in this case has been produced as an extruded component and additionally three-dimensionally stamped, in particular by press forming, so that it is adapted to the contour of the sill region 4 of the frame plate 2 according to the invention and at the same time by means of the stamped-out portion comes to bear on the frame plate 2, forming a plurality of hollow chambers. For example, the sill reinforcement 14 may be bonded to the frame plate 2, in particular onto the inner face of the frame plate 2. The stamped portions may also be configured in the form of shaped portions. In cooperation with the frame plate 2, therefore, hollow chambers are formed, said hollow chambers significantly increasing the rigidity of the motor vehicle door 1 produced thereby.

A hinge reinforcement 16 which is also coupled to an outer face 17 of the frame plate 2 is shown in FIGS. 5a and b. The hinge reinforcement 16 in this case is also produced as an extruded component which subsequently is three-dimensionally shaped and stamped and in this case for receiving a hinge, not shown in more detail. According to the invention the hinge reinforcement 16 has different wall thicknesses, in this case by way of example the wall thicknesses w1 to w4, according to which the wall thickness w1 is smaller than the wall thickness w2, smaller than the wall thickness w3 and smaller than the wall thickness w4. As a result, the required loads may be individually catered for with optimal use of the weight. Moreover, the hinge reinforcement 16 has a shaped portion 18, for example in the form of a collar which has been punched through. This applies in turn to the production of a bearing contact with the frame plate 2 and/or to the formation of different hollow chambers.

Moreover, in FIG. 6 a mirror reinforcement 19 is shown, wherein the mirror reinforcement 19 also has different individual wall thicknesses. Moreover, the mirror reinforcement 19 has mounting openings 20 so that a mirror triangle or even an external mirror may be screwed thereto, and/or corresponding cable leads are able to be passed therethrough.

A cross section of the window frame reinforcement 21 is also shown in FIG. 7, said window frame reinforcement being configured as a hollow chamber profile which is P-shaped in cross section. It is also possible here to produce different wall thicknesses w1, w2 by means of the extrusion method as well as an individual outer contour and or shaping by subsequent three-dimensional shaping, in particular in the form of bending or press forming.

Figure 8:
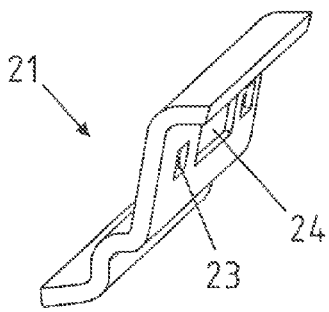
FIG. 8 shows a lock reinforcement according to the invention in a perspective view and FIG. 9 shows a door impact support according to the invention with cutting lines and cross-sectional views.

In FIG. 8, a lock reinforcement 22 is also shown, said lock reinforcement also being configured as an extruded component which is configured so as to be S-shaped in cross section. In particular, this has been stamped out so that corresponding receiver openings 23 and openings 23 and through-openings 24 are present for a corresponding door lock.

Figure 9:
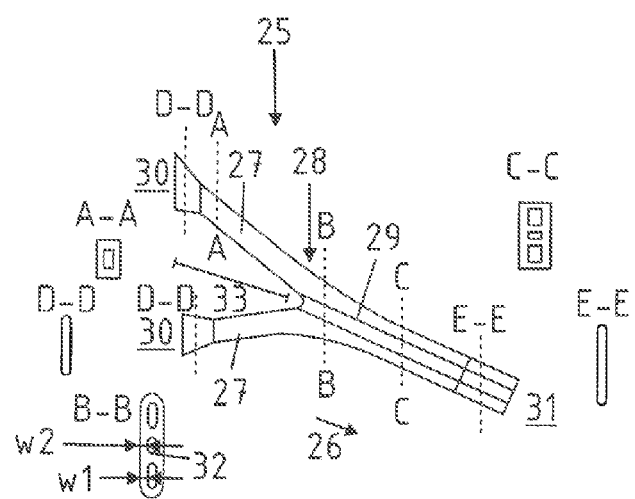

Finally in FIG. 9, a door impact support 25 is shown according to the invention. The door impact support 25 in this case has a Y-shaped contour in its longitudinal direction 26. The Y-shaped contour has in this case two arms 27 for forming the Y-shaped birfurcation and from the bifurcation point of the Y-shape a base 29 extending via the central portion 28. The ends 30 of the arms 27 and the end 31 of the base 29 are in each case configured so as to be flattened in cross section, which is shown along the cutting lines D-D and E-E. The arms 27 in turn are shown in the cutting line A-A and in each case configured as a single-chamber hollow profile. In the central portion 28, the cross-sectional profile has a three-chamber hollow profile along the cutting line B-B.

For producing the door impact support 25 according to the invention, initially an extruded profile is provided with three hollow chambers. This extruded profile has different wall thicknesses w1, w2. The central chamber 32 is then incised along a length 33 which corresponds to the length of the subsequent arms 27. The arms 27 are then bent apart from one another and, after being bent apart, particularly preferably the bent blank thus produced is three-dimensionally press-formed. In this case it is achieved, amongst other things, that the cross section is altered along the cutting line C-C. Furthermore, the cross section according to the cutting line C-C may already serve as an initial profile and then the cutting line B-B in cross section may be produced by corresponding three-dimensional press forming. Thus the door impact support 25 may be optimally adapted to the required contour and the curvature path of the motor vehicle door 1. The respective ends 30, 31 are then flattened and/or pressed together or obliquely cut to length and may preferably be perforated, not shown in more detail here by way of example, so that a through-opening for a screw connection is possible.

LIST OF REFERENCE NUMERALS

1—Motor vehicle door
2—Frame plate
3—Window frame
4—Sill region
5—Beltline region
6—Lock region
7—Hinge region
8—Inner panel
9—Outer panel
10—Recess for loudspeaker
11—Outer skin
12—Beltline reinforcement
13—Opening
14—Sill reinforcement
15—Reinforcement bead of 14
16—Hinge reinforcement
17—Outer face of 2
18—Shaped portion
19—Mirror reinforcement
20—Opening
21—Window frame reinforcement
22—Lock reinforcement
23—Opening
24—Through-opening
25—Door impact support
26—Longitudinal direction of 25
27—Arm
28—Central portion
29—Base
30—End of 27
31—End of 29
32—Central chamber
33—Length of 27
L—Length of
Y—Motor vehicle transverse direction
w1—Wall thickness
w2—Wall thickness
w3—Wall thickness
w4—Wall thickness
X—Motor vehicle X-direction
Z—Motor vehicle Z-direction

The invention claimed is:

1. A method for producing a motor vehicle door, comprising:
providing a motor vehicle door frame plate, wherein the door frame plate is press-formed from a light metal alloy;
extruding a profile from an aluminum alloy, wherein the extruded profile has different wall thicknesses in a longitudinal direction and/or in a transverse direction;
cutting the extruded profile at a first length to form individual extruded profile pieces;
press forming of the extruded profile piece in a three-dimensional manner to form a reinforcement component for reinforcing a region of the motor vehicle door frame plate;
stamping the reinforcement component;
perforating the stamped reinforcement component; and,
coupling the at least one reinforcement component to the motor vehicle door frame plate.

2. The method of claim 1, further comprising annealing the extruded profile pieces.

3. The method of claim 2, further comprising quenching said extruded profile pieces.

4. The method of claim 3, wherein the quenched extruded profile pieces are artificially or naturally aged.

5. The method of claim 1, further comprising welding said at least one reinforcement component to said vehicle door frame.

6. The method of claim 1, wherein the at least one reinforcement component is riveted to the vehicle door frame plate.

7. The method of claim 1, further comprising coupling the at least one reinforcement component to the motor vehicle door frame plate at two regions and creating a hollow space between the at least one reinforcement component and the motor vehicle door frame plate.

8. The method of claim 1, further comprising providing a Y-shaped door impact support having a base portion and two bifurcating arms extending therefrom.

9. The method of claim 8, wherein each bifurcating arm includes an end, and wherein the ends are flattened.

* * * * *